P. NICHOLSON.
SPHYGMOMANOMETER.
APPLICATION FILED FEB. 7, 1913.
1,077,365.
Patented Nov. 4, 1913.
2 SHEETS—SHEET 1.
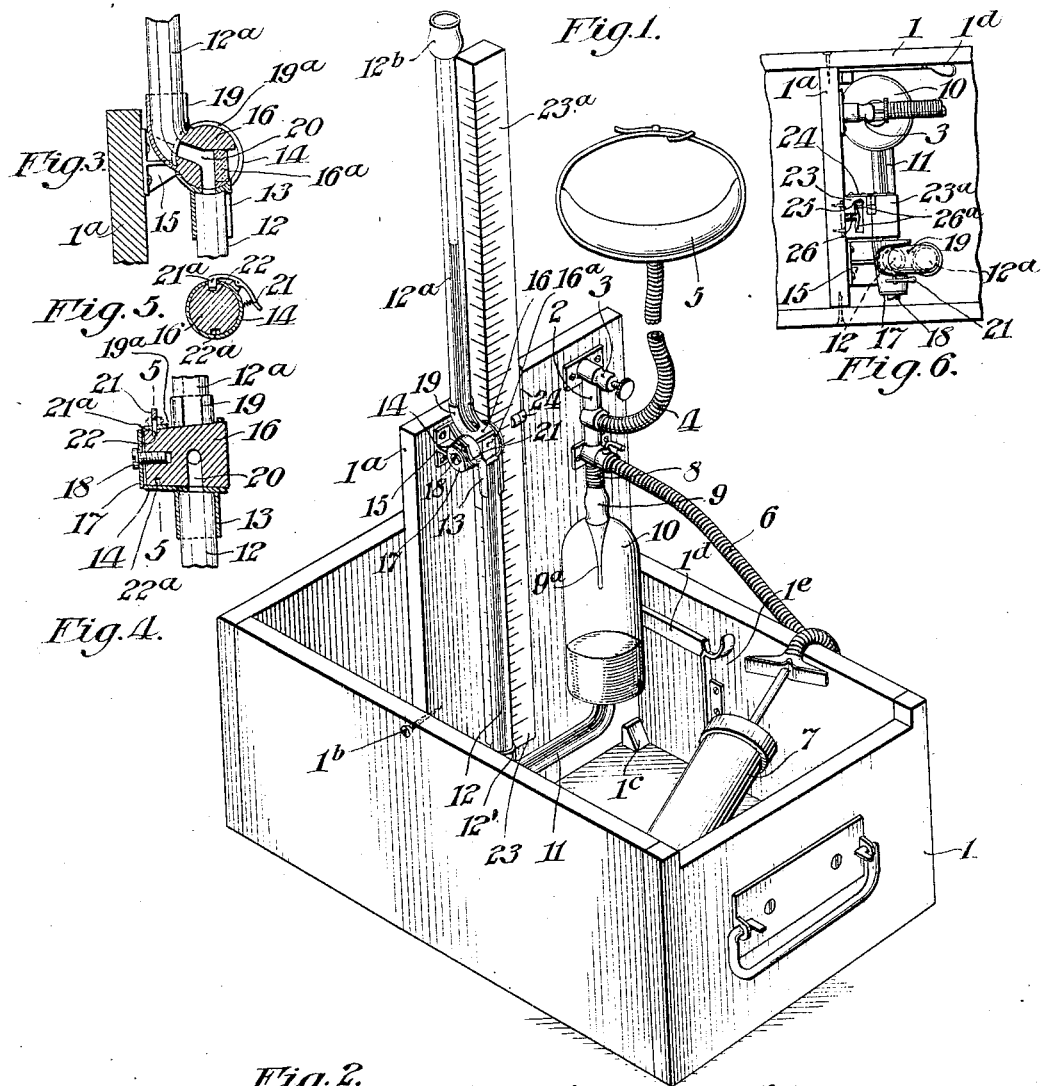
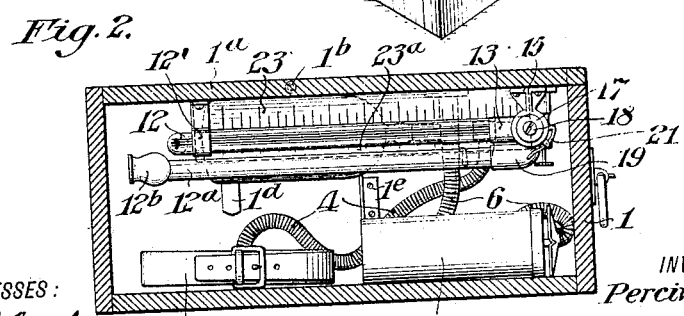
WITNESSES:
R. Schleicher
Geo. A. Dunney
INVENTOR
Percival Nicholson,
BY
Charles N. Butler
ATTORNEY.

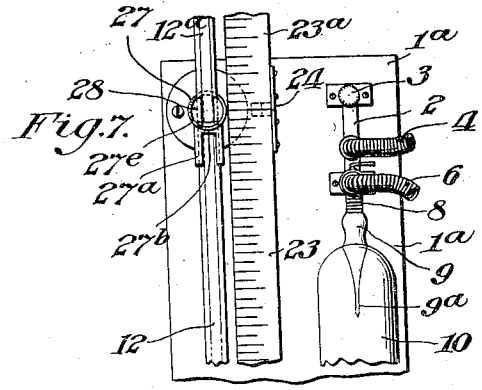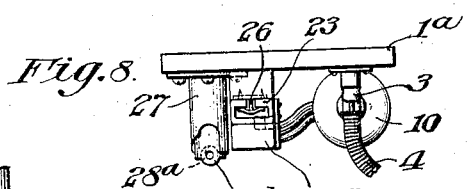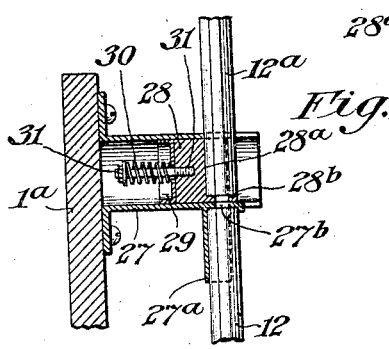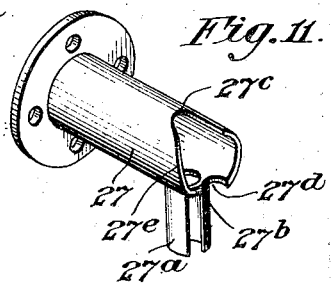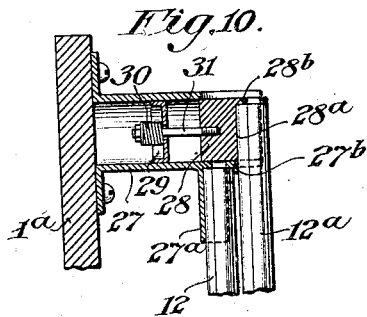

UNITED STATES PATENT OFFICE.

PERCIVAL NICHOLSON, OF ARDMORE, PENNSYLVANIA.

SPHYGMOMANOMETER.

1,077,365.

Specification of Letters Patent. Patented Nov. 4, 1913.

Application filed February 7, 1913. Serial No. 746,789.

*To all whom it may concern:*

Be it known that I, PERCIVAL NICHOLSON, a citizen of the United States, residing at Ardmore, in the county of Montgomery and State of Pennsylvania, have invented certain Improvements in Sphygmomanometers, of which the following is a specification.

My invention relates to improvements in sphygmomanometers designed to render the apparatus more compact, convenient and efficient. In its preferred form it comprises a cistern connected with a tube and having fluid pressure mechanism connected therewith whereby fluid in the cistern can be forced into the tube and the pulse of a patient obliterated, in combination with a tube hinged to said first tube by a valve mechanism whereby said tubes can be brought into communication so that the second becomes a continuation of the first or said second tube can be folded upon said first tube with the simultaneous closure of said first tube, an adjustable scale having a hinged section whereby the liquid column in said tube or tube sections can be read and the hinged scale section can be folded upon the complementary scale section, and a case having a lid by which the foregoing parts are supported.

This apparatus provides the desiderata that it can be incased within a comparatively small compass, that the connection of the upper tube or tube section with the lower tube or tube section by the combined valve and hinge provides for connecting the sections in communication with a long and consequently accurate reading tube for the mercury used and preventing the escape of mercury by the operation of folding the movable tube section, and that a comparatively long and uniformly graduated scale can be used by reason of the adjustable and sectional character of the parts, with the provision of reliable as well as convenient means for determining blood pressure.

The characteristic improvements of my invention will more fully appear by reference to the following description and the accompanying drawings in illustration thereof.

In the drawings, Figure 1 is a perspective view of a form of apparatus embodying my invention, Fig. 2 is a sectional view of the same with the case closed and the hinged parts folded therein, Fig. 3 is a transverse sectional view taken through the passage of the valve, Fig. 4 is a longitudinal sectional view of the valve mechanism, Fig. 5 is a sectional view taken on the line 5—5 of Fig. 4, Fig. 6 is a top plan view of part of the apparatus shown in Fig. 1 with the top sections of the mercury tube and scale folded, Fig. 7 is an elevation showing a section of apparatus embodying modified details of construction, Fig. 8 is a top plan view of the apparatus shown in Fig. 7 with the top section of the mercury tube and scale folded, Fig 9 is a vertical sectional view taken through the axis of the valve shown in Fig. 7 with the mercury tube sections in alinement, Fig. 10 is a view similar to that of Fig. 9 with the top section of the mercury tube folded, and Fig. 11 is a perspective view of the valve casing.

The apparatus, as illustrated in the drawings, comprises the case 1 having the lid 1$^a$ hinged by the pintles 1$^b$. The bottom of the case is provided with the stop 1$^c$ for engaging the bottom of the lid 1$^a$ when the latter is in the vertical position and the lid is provided with the strut or latch 1$^b$ for positively engaging the spring hasp 1$^e$ to hold the bottom of the lid in firm position against the stop 1$^c$.

The lid has secured to its inner side the metal tube 2 provided at its upper end, when vertical, with a needle valve 3, and connected intermediately of its ends, with the flexible tube 4 of the pneumatic cuff 5 and the flexible tube 6 of the air pump 7. The end of the tube 2 opposite the valve 3 is coupled by a rubber tube 8 with the neck 9 of a glass cistern 10 having a capillary tube 9$^a$ extending downwardly into it from the neck 9, and the bottom of the cistern is connected by a glass bend 11 with a glass tube or tube section 12 engaged to the lid by a keeper 12′.

In the form of the invention illustrated in Figs. 1 to 6, inclusive, the top of the tube section 12 is set in the fenestrated socket 13 of a conical valve casing 14 having the bearing or bracket 15 by which it is secured to the lid 1$^a$. A conical valve 16 having the fenestration 16$^a$ is held in casing 14 by the disk 17, which loosely engages the small end of the casing, and the screw 18, which passes through the disk into the valve, the valve being revoluble in the casing and adjustable therein by means of the screw. A fenestrated socket 19 on the valve, and adapted to turn therewith in the circular aperture 19ª of the casing, receives an end of the glass tube section 12ª (having a funnel or open bowl top 12ᵈ) which is, when in the erected position, in communication with the section 12. The passage 20 through the valve 16 communicates at all times with the section 12ª and with the section 12 when section 12ª is substantially parallel thereto or in the erected position. But when section 12ª is folded or in the position shown in Figs. 2 and 6, the valve 16 closes the top or outer end of the section 12. A spring pressed dog 21 is fulcrumed on the casing 14, the jaw 21ª of the dog being adapted for engaging the recesses 22 and 22ª of the valve to hold it in its respective positions, with the section 12ª in communication with the section 12 and in folded relation thereto. The scale comprises the sections 23 and 23ª connected by the hinge 24. The section 23 contains the T-slot 25, and T-clips 26, fixed to the lid 1ª, engage the scale section to the lid, the clips having the resilient wings 26ª which frictionally engage the scale section within the slot so that such section is adjustable and normally held in position thereby.

When the apparatus is not in use, the parts occupy the position shown in Fig. 2. When in use, the parts 1ª, 12ª and 23ª are in the vertical position, the scale is adjusted so that its datum corresponds to the level of the mercury in the mercury tube, the cuff is applied, and the pump is operated until the pulse is obliterated when the reading of the column of mercury by the scale will indicate the blood pressure.

In the form of the invention illustrated in Figs. 7 to 11 inclusive, the lid 1ª has fixed to its inner side the valve casing 27 provided with the fenestrated socket 27ª in which is engaged the outer end of the tube 12. A cylindrical valve 28, movable in the casing 27, is provided with the fenestrated socket 28ª which receives an end of the tube 12ª. The bore of this tube registers with the valve passage 28ᵇ which is adapted to register with the bore of the tube 12 through the casing passage 27ᵇ. A bearing 29, fixed in the casing, supports a coiled spring 30 which engages a bolt 31 movable through the bearing and fixed in the valve. The casing 27 is provided with the sockets 27ᶜ and 27ᵈ, which are adapted for engaging the tube 12ª in its erected and folded positions, the sockets being connected by the cam surface 27ᵉ adapted for moving the tube 12ª and the valve 28 outwardly from the position shown in Fig. 9 to that shown in Fig. 10. The scale section 23 is connected to the lid 1ª and to the section 23ª as previously described. It will be understood that the parts of this form of the apparatus are shown in operative position in Figs. 7 and 9, in which the tube sections 12 and 12ª are held in alinement, communicating through the registering passages 27ᵇ and 28ᵇ, which position is maintained by the engagement of the section 12ª in the socket or bearing 27ᶜ and the action of the spring 30 through the bolt 31 on the valve 28. When not in use, the parts 12ª and 23ª are folded to their position in Figs. 8 and 10 in which position the valve 28 closes the passage 27ᵇ, the folding of the part 12ª having turned the valve 28 which has been moved outwardly in the casing 27 by the action of the cam 27ᵉ against the action of the spring 30. This spring holds the folded tube 12ª in the socket 27ᵈ.

Having described my invention, I claim:

1. The combination of a cistern, a tube section having a bend connected with said cistern, a second tube section, means comprising a valve whereby said second tube section is hinged to said tube section first named and communication between said sections is controlled, and a scale for reading the height of a liquid column in either of said sections.

2. The combination of a cistern, a tube section connected with said cistern, a valve casing connected with an end of said tube section, a valve journaled in said casing, said valve having a passage adapted for communicating with said tube and a socket in communication with said passage, and a tube section having an end seated in said last named socket, said valve acting as a hinge for said second tube section and serving to close said first named tube section.

3. The combination of a case having a hinged lid, a cistern and tube connected by a bend and connected to the inside of said lid, a second tube, and valve mechanism whereby said tubes are connected and said second tube is hinged in relation to said first tube.

4. The combination of a case having a hinged lid, a cistern and a tube communicating therewith and fixed within said lid, a second tube adapted to communicate with said first tube and means whereby said second tube is hinged with relation to said first tube and the communication between said tubes is controlled.

5. The combination of a cistern, a tube communicating therewith, a second tube adapted to communicate with said first tube, means whereby said second tube is hinged to said first tube and the communication between them controlled, and a scale having sections in juxtaposition to said tubes when in communication, said scale sections being hinged together.

6. The combination of a cistern, a tube having a bend connected with said cistern, a valve casing having a device thereon for engaging an end of said tube, a second tube, a valve journaled in said casing, said valve having a device thereon for engaging an end of said second tube and a passage whereby said tubes are adapted to be connected, and a scale having hinged sections disposed in proximity to said tubes when the latter are in communication.

7. The combination of a cistern, a tube having a bend connected therewith, a valve casing having a fenestrated socket in which an end of said tube is seated, a valve journaled in said casing and having a fenestrated socket, a tube having an end seated in said valve socket, said valve having a passage whereby said tubes are adapted to be connected, means whereby said valve is movable longitudinally in said casing, and means for holding said valve in several positions whereby communication between the tubes is controlled.

8. The combination of a cistern, a tube having a bend connected therewith, a valve casing having a socket in which an end of said tube is seated, a valve journaled in said casing and having a socket, a tube having an end seated in said last named socket, said valve being adapted for controlling communication between said tubes and being movable longitudinally in said casing, and means whereby said valve is held in several positions.

9. The combination of a cistern, a tube having a bend connected therewith, a second tube, and means comprising a fenestrated valve mechanism whereby said tubes are connected, the second tube can be moved relative to the first and the first tube can be closed.

In testimony whereof I have hereunto set my hand this 5th day of February, 1913, in the presence of the subscribing witnesses.

PERCIVAL NICHOLSON.

Witnesses:
CHARLES N. BUTLER,
GEO A. CUNNEY.

---

Copies of this patent may be obtained for five cents each, by addressing the "Commissioner of Patents, Washington, D. C."